(12) United States Patent
Kallela et al.

(10) Patent No.: US 6,760,639 B2
(45) Date of Patent: Jul. 6, 2004

(54) SYSTEM AND METHOD FOR DETERMINING THE EFFECTIVENESS OF PRODUCTION INSTALLATIONS, FAULT EVENTS AND THE CAUSES OF FAULTS

(75) Inventors: Jari Kallela, La Hulpe (BE); Gerhard Vollmar, Meckenheim (DE); Manuel Greulich, Heidelberg (DE); Raiko Milanovic, Heidelberg (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/209,383

(22) Filed: Jul. 29, 2002

(65) Prior Publication Data

US 2003/0014699 A1 Jan. 16, 2003

Related U.S. Application Data (63) Continuation of application No. PCT/EP00/00713, filed on Jan. 29, 2000.

(51) Int. Cl.[7] .............................. G05B 13/02; G06F 11/30
(52) U.S. Cl. .......................... 700/111; 700/29; 706/912; 714/47
(58) Field of Search .............................. 700/28–32, 44, 700/45, 47–51, 95, 96, 108–111; 706/45–48, 59–61, 903, 904, 906, 911, 912, 914; 714/25, 26, 31, 47, 48, 57

(56) References Cited

U.S. PATENT DOCUMENTS

| | | | |
|---|---|---|---|
| 5,067,099 A | | 11/1991 | McCown et al. ............ 702/183 |
| 5,119,318 A | * | 6/1992 | Paradies et al. ............... 706/52 |
| 5,859,964 A | * | 1/1999 | Wang et al. ................... 714/48 |
| 5,914,879 A | | 6/1999 | Wang et al. ................. 700/111 |
| 6,243,696 B1 | * | 6/2001 | Keeler et al. .................. 706/21 |
| 6,256,550 B1 | * | 7/2001 | Wu et al. .................... 700/121 |
| 6,336,138 B1 | * | 1/2002 | Caswell et al. ............. 709/223 |
| 6,549,820 B1 | * | 4/2003 | Barrett et al. ................ 700/110 |

FOREIGN PATENT DOCUMENTS

| | | |
|---|---|---|
| EP | 0 482 522 A1 | 4/1992 |
| WO | WO 99/15710 | 4/1999 |

OTHER PUBLICATIONS

M. Srinivasan et al.: "Performance and Productivity Improvements in an Advanced Dielectric Etch Reactor for sub 0.3µm Applications", *1998 IEEE/SEMI Advanced Semiconductor Manufacturing Conference*, pp. 419–422.
Bob Hansen: "Learning the Power of Overall Equipment Effectiveness", *The 4th Annual Machinery Reliability Conference and Exhibition*, Apr. 12–14, 1999, Cincinnati, Ohio, pp. 19–30.

* cited by examiner

Primary Examiner—Maria N. Von Buhr
(74) Attorney, Agent, or Firm—Laurence A. Greenberg; Werner H. Stemer; Gregory L. Mayback

(57) ABSTRACT

A method and a system are described for determining the effectiveness of production installations, significant fault events that bring about deviations from a desired effectiveness and the causes of fault events. The production installation is connected to a data acquisition device, which is set up for continuous acquisition and ready-to-call-up storage of installation and production-related data. A service device is connected to the data acquisition device and has an input device for the input of additional installation and production-related descriptive data that cannot be called up from the data acquisition device. An online system part is set up for calling up installation and production-related data from the data acquisition device, calculating the effectiveness, detecting fault events, determining significant fault events by fault event evaluation, and determining in each case the causes of faults. An offline system part is provided and contains a number of generic fault models and assessment models.

21 Claims, 12 Drawing Sheets

Figure 4: OEE display and alarm

```
OEE papermaking machine()
{
// OEE script for the verification of fault hypotheses of a papermaking machine // Verifying the fault hypotheses if( PumpOn = 0 ) then {
            newState = 3 ;   // 3 pump fault
    }
    else {
        if( WebOn = 0 ) then {
                newState = 2 ;   // 2 fibre breakage
        }
        else {
            if( RollSpeed < 20 ) then {
                    newState = 1 ;   // 1 creeping speed
            }
            else {
                    newState = 0 ;   // 0 undisturbed operation
            }
        }
    }

// Storing of the fault events in the fault database
    if( newState != oldState) then {
            NewClassId(Now, NewClassL1);
            oldState = newState ;
    }
}
```

Figure 5: OEE script

| ID | Value | Description |
|---|---|---|
| Mach_on | 01 | Machine switched on |
| Mach_off | 00 | Machine switched off |
| Counter_1 | 00034521 | Incoming parts |
| Counter_2 | 00012896 | Outgoing parts |
| Oil_temp | 65.12 | Starting temperature of the auxiliary oil supply |
| Mach_speed | 1500 | Speed of the motor |
| Mach_ID | 0021 | Fault status of the machine |

Figure 6: Data from the control system

| Time | Production area | Fault event | Event category | Duration |
|---|---|---|---|---|
| 01/01/1999 05:10:45 | Line_2 | Oil pump off | DT Technical | 00:50:30 |
| 01/01/1999 21:20:05 | Filling | No bottles | ST Induced | 00:30:00 |
| 03/01/1999 20:20:25 | Filling | No bottles | ST Induced | 01:04:30 |
| 03/01/1999 22:05:05 | Line_2 | Oil pump off | DT Technical | 02:05:00 |
| 03/01/1999 22:20:55 | Machine_3 | Motor off | DT Technical | 01:06:15 |
| 05/01/1999 00:20:10 | Line_2 | Poor material | DT Quality | 00:45:10 |
| 05/01/1999 12:00:05 | Line_2 | Servicing | ST Operational | 00:10:00 |

Figure 7: Structure of the fault database

| Production area | Event category | Costs [/min] |
|---|---|---|
| Line_2 | ST Operational | 300 |
| Line_2 | DT Technical | 1000 |
| Filling | ST Induced | 40 |
| Line_4 | DT Technical | 100 |
| Machine_3 | DT Technical | 100 |

Figure 9: Assessment model

| Event category | |
|---|---|
| ST Operational | Planned stop for operative actions |
| ST Induced | Unplanned stop, organizational |
| DT Technical | Unplanned stop, machine fault |
| DT Operational | Unplanned stop, operating error |
| DT Quality | Unplanned stop, quality standard impaired |

Figure 8: Event categories

Figure 10: Pareto analysis

| Descriptive data | |
| --- | --- |
| Production installation (type) | Brewery |
| Production area (system) | Filling installation |
| Machine/equipment | Bottle closer |
| Machine/equipment type (optional) | |
| Fault event | Oil pump off |
| Event category | DT Technical |

Figure 11: Descriptive data for fault model

Figure 12: Fault model

OEE = [[machine running time / total time]
× [desired processing time / actual processing time]
× [productive time / machine running time]
× [number of good parts / number of parts]] 100

Figure 13: OEE calculation formula

SYSTEM AND METHOD FOR DETERMINING THE EFFECTIVENESS OF PRODUCTION INSTALLATIONS, FAULT EVENTS AND THE CAUSES OF FAULTS

CROSS-REFERENCE TO RELATED APPLICATION

This application is a continuation of copending International Application No. PCT/EP00/00713, filed Jan. 29, 2000, which designated the United States and was not published in English.

BACKGROUND OF THE INVENTION

Field of the Invention

The invention relates to a system and a method for determining the effectiveness (overall equipment effectiveness (OEE)) of production installations, fault events and the causes of the fault events significantly contributing to losses in productivity.

Effectiveness is understood here as the concept of "Overall Equipment Effectiveness, OEE", which is described for example in the reference by Robert Hansen, titled "Learning the Power of Overall Equipment Effectiveness", and in the 1999 conference report Machinery Reliability Conference and Exposition, titled "The Meeting of Machinery Reliability Minds", April 12–14, Cincinnati, Ohio, pages 19 to 30, published by Industrial Communications, Inc., 1704 by Natalie Nehs Dr., Knoxville, Tenn. 37931.

OEE is accordingly a method for determining a percentage that indicates to what extent the actual productivity in each case reaches a planned, that is prescribed, productivity. OEE is also referred to as the multiplication of synergistic parameters, which define the "health" of a process, to be specific OEE =availability ×processing speed ×quality.

For commercial reasons, and to safeguard product quality, operators of production installations have an interest in determining a desired effectiveness, which can be achieved in an undisturbed operation, and comparing the effectiveness at a given time with it. If the effectiveness at a given time deviates from the desired value, this indicates losses in productivity. It must then be determined which fault events exist and what is causing them. The causes may have their roots in physical, human or organizational areas.

Various methods and techniques can be used for the analysis of faults (in the sense of losses in productivity). The most important of these are failure modes and effects analysis (FMEA), fault tree analysis, or methods of statistical evaluation, such as for example the Pareto analysis [by John Moubray, RCM2, Butterworth-Heinemann, Second Edition 1997].

In the implementation of an FMEA, the following steps are taken:
a) functional breakdown of the installation;
b) description of main function and secondary function;
c) description and listing of functional fault statuses;
d) determination of all causes for each fault status;
e) determination of the effects on production objectives; and
f) quantitative assessment of the effects.

Fault tree analysis starts from an undesired TOP state. For this starting event, all the event situations that lead to this state are determined.

Statistical methods presuppose a suitable base of data from production. For example, with a Pareto analysis, those causes of faults that are responsible for the main production faults can be determined. FMEA and fault tree analysis can be supported by tools. Such tools guide the user step by step through the method, provide support in data acquisition and document the results.

The statistical methods presuppose, however, a suitable database, which is often not present. Either no data at all from production are recorded or else the information that would be necessary for a fault analysis is not acquired.

The methods mentioned above have their roots in engineering design, i.e. they are used for configuring a product or an installation to be as fail-safe as possible. The high standard of quality of the product reached justifies the considerable expenditure in terms of time and work for such analyses.

The 'post-mortem' analysis of losses and faults in a production installation is often time-critical, since the sustained loss in productivity entails considerable costs. A further disadvantage is that the methods do not support any procedure focusing on the cause of the fault at a given time.

It is known from the literature that there may be up to 7 cause levels between the fault events and the actual cause of the fault [John Moubray, RCM2, Butterworth-Heinemann, Second Edition 1997]. None of the known methods can indicate when the suitable level, which ensures lasting elimination of the cause of the fault, has been found.

SUMMARY OF THE INVENTION

It is accordingly an object of the invention to provide a system and a method for determining the effectiveness of production installations, fault events and the causes of faults which overcome the above-mentioned disadvantages of the prior art devices and methods of this general type, which make possible an automated determination of the effectiveness at a given time, fault events and the causes of faults.

With the foregoing and other objects in view there is provided, in accordance with the invention, a system for determining an effectiveness of production installations of various types, significant fault events which bring about deviations from a prescribed desired effectiveness, and causes of the significant fault events. The system contains a data acquisition device to be connected to a respective production installation and set up for continuous acquisition and ready-to-call-up storage of data including installation-related data and production-related data. A service device is connected to the data acquisition device. The service device includes an input device for inputting additional descriptive data including installation-related descriptive data and production-related descriptive data that cannot be called up from the data acquisition device, and a display device for displaying the effectiveness determined, the significant fault events and the causes of the significant fault events. An online system part is connected to and set up for calling up the installation-related data and the production-related data from the data acquisition device. The online system part has a fault event detector detecting the significant fault events on a basis of the data, the additional descriptive data input by the input device, and on an overall equipment effectiveness (OEE) script. The online system part determines the significant fault events by fault event evaluation using a configured assessment model, determines in each case the causes of the significant fault events using a configured fault model, and calculates the effectiveness. An offline system part is connected to the online system part. The offline system part contains or has access to a number of models including generic fault models and assessment models. The offline system part is set up for searching for the models on a basis of at least of called-up and/or input descriptive data. The offline system part configures the models and stores the models locally or in a locally distributed form. The offline system part is configured for storing the models in the online system part as the configured assessment model or the configured fault model.

The system according to the invention includes a service device, which is preferably configured as a mobile device and can be connected in each case to a data server in the master control system of a production installation. Both the method used and the implementation as a system are based on the use of pre-configured solution models. Such solution models can be established by an offline system part and be used in an online system part.

The service device can be used in an advantageous way for the analysis of causes in different production installations, for example both for the analysis of the causes of drops in productivity or inferior product quality in the making of paper and in filling installations for the filling of liquids in the food industry. This universal applicability is achieved by a series of generic models and by pre-configured assessment and fault models.

In accordance with an added feature of the invention, the respective production installation is a single machine or an installation having a number of machines.

In accordance with an additional feature of the invention, the data acquisition device is part of a master control system or a programmable controller.

In accordance with another feature of the invention, the service device is set up for using a web browser to access models which are a stored on a web server and for storing configured models there.

In accordance with a further feature of the invention, the online system part has an OEE calculator set up for calculating the effectiveness by using a stored OEE calculation formula.

In accordance with a further added feature of the invention, the fault event detector is set up for detecting the significant fault events by limit value monitoring the OEE script.

In accordance with a further additional feature of the invention, the online system part is set up for determining the significant fault events using a Pareto analysis and the configured assessment model. The online system part includes a cause determiner set up for determining causes of the significant event faults by using fault event data and the configured fault model or an expert system.

In accordance with another further feature of the invention, the service device is set up for determining recommendations for eliminating the significant faults events, visually presenting the significant fault events and/or outputting the significant fault events for further transmission.

In accordance with another added feature of the invention, the offline system part has a model searcher and a library storing the generic fault models for finding a best model. The best model is a fault model of which a fault event description is most similar to a respective search inquiry. The offline system part includes a model configurer and a model editor connected to the model configurer for configuring the generic fault models. The offline system part further includes a model generalizer for generalizing configured models and for storing the configured models in the library for reuse.

In accordance with another additional feature of the invention, the offline system part includes a model editor and with the aid of the model editor a search inquiry can be formulated for the model searcher.

With the foregoing and other objects in view there is provided, in accordance with the invention, a method for automatically determining an effectiveness of a production installation, significant fault events, and causes of the effectiveness deviating from a prescribed desired state. The method includes calling up productivity-relevant historical data acquired and stored by a data acquisition device connected to the production installation using a fault event detector, inputting additional data including installation-related data and production-related data, carrying out a continuous calculation of the effectiveness using an OEE calculator and a suitable method, performing an investigation of the data with regard to fault event patterns using a fault event detector, storing detected fault events as time series in a fault database, and identifying the significant fault events from the detected fault events using a fault event evaluation and a stored configured assessment model. The causes of faults are determined using a cause determiner with respect to a respective significant fault event, taking into account additionally input data containing a description of specific environmental conditions. The causes of faults determined and the effectiveness determined are presented visually and/or as a data output.

In accordance with an added mode of the invention, there is the step of carrying out the continuous calculation of the effectiveness using the OEE calculator and by accessing the fault events stored in the fault database.

In accordance with an additional mode of the invention, there is the step of editing additional fault events, which cannot be detected by the fault event detector using a configured OEE calculation script, using a fault event input.

In accordance with another mode of the invention, there are the steps of determining significant fault events using a fault event evaluator, and presenting visually the significant fault events in a Pareto diagram.

In accordance with a further mode of the invention, there are the steps of using a model searcher for searching by use of descriptive data stored in a model library for that generic model which best matches a specific fault event and the production installation, and feeding the generic model to a model editor and to a model configurer for forming configured models. The configured models are used for an evaluation of fault events and for a cause analysis.

In accordance with a further added mode of the invention, for determining the causes of faults by the cause determiner, cause hypotheses of a configured error model which contains cause-effect diagrams extending over a number of model levels are verified by the cause determiner using the descriptive data. The configured error model is worked step by step from one level to the next until an actual cause is found.

In accordance with a further additional mode of the invention, there is the step of using a fault model, which has a recommendation model added to it and with the aid of which recommendations for eliminating faults are determined and output.

In accordance with a concomitant feature of the invention, there are the steps of generalizing models configured in a course of the method by a model generalizer for later reuse resulting in generalized models, and storing the generalized models in a model library, elements of a respective model being one of generalized and removed.

Other features which are considered as characteristic for the invention are set forth in the appended claims.

Although the invention is illustrated and described herein as embodied in a system and a method for determining the effectiveness of production installations, fault events and the causes of faults, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
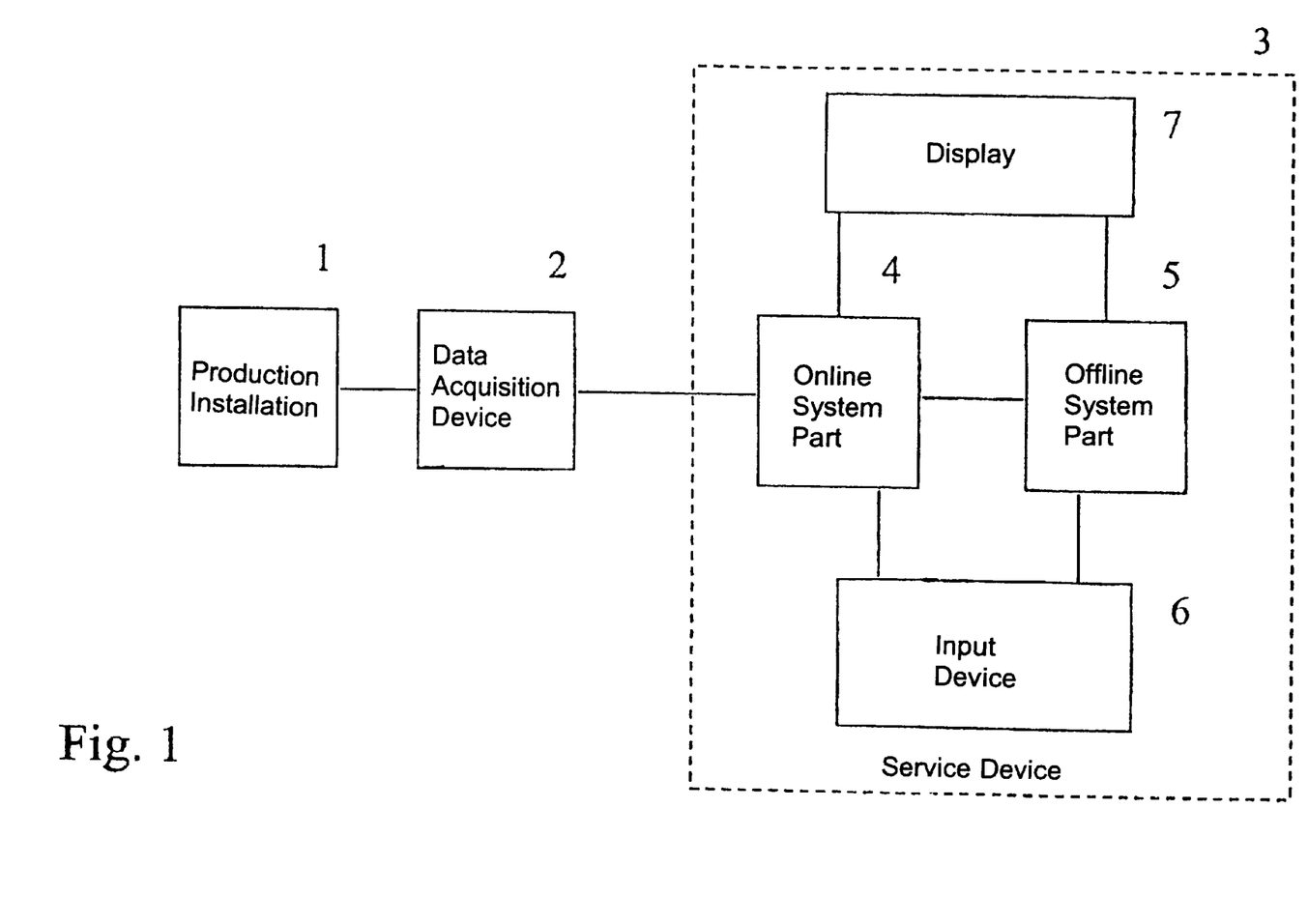
FIG. 1 is a block diagram of a system according to the invention for determining effectiveness, fault events and causes of faults.

Referring now to the figures of the drawing in detail and first, particularly, to FIG. 1 thereof, there is shown a block diagram having a production installation 1, which is connected to a data acquisition device 2. The production installation 1 may be a single machine or complex installation with a multiplicity of production devices. Production installations of various types may be, for example a papermaking machine, a brewery, or the filling installation thereof, or a production installation in the area of motor vehicle production.

The data acquisition device 2 includes a data server 30 (see FIG. 2), which provides data required for analysis purposes, for example data from a master control system or control system, a production planning system or a maintenance system.

For effectiveness determination, fault analysis and cause analysis, a service device 3 can be temporarily connected or is permanently connected to the data server 30 of the data acquisition device 2.

The service device 3 includes an online system part 4 and an offline system part 5, the online system part 4 being connected to the data acquisition device 2 and to the offline system part 5. There is also an input device 6 and a display device 7, which are respectively connected to the system parts 4, 5. A description of the components of the service device is given below on the basis of FIG. 2.

Figure 2:
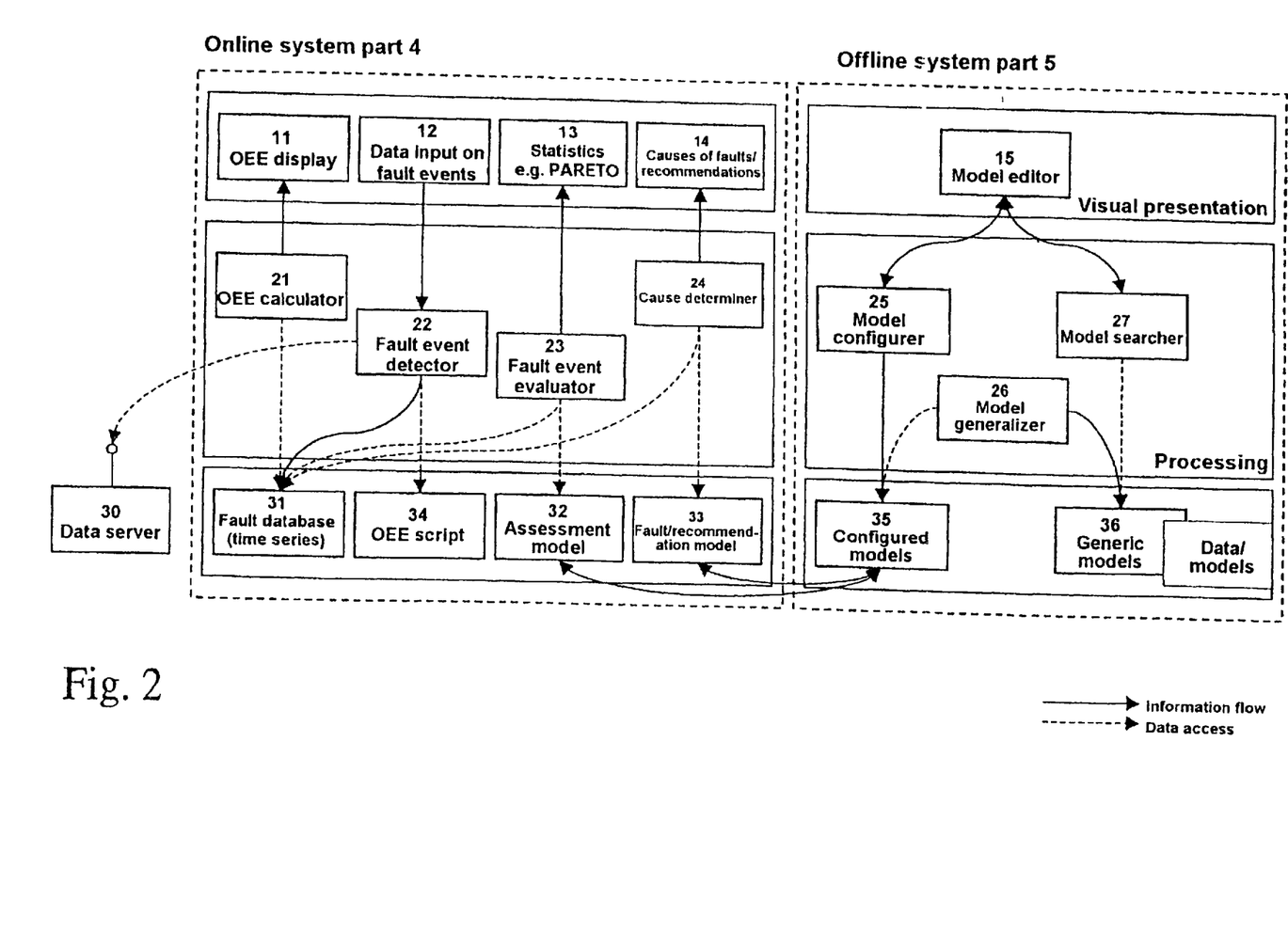
FIG. 2 is a block diagram showing the components of online and offline system parts of the system according to FIG. 1.

FIG. 2 shows the online system part 4 and the offline system part 5 of the service device 3.

The online system part 4 makes it possible for the OEE, relevant fault events and the causes of faults to be determined in an automated manner. For this purpose, it includes an OEE calculator 21, which is set up for accessing data that are provided in a fault database 31. Results of the OEE calculation can be displayed on an OEE display 11.

A fault event detector 22 is set up for calling up data from the data server 30 and for accessing an OEE script 34, which contains the criteria for the fault events, and for taking into account additional information, which can be input by a data input 12, for the detection of a fault event. Determined fault events can be stored by the fault event detector 22 in the fault database 31 as a time series.

A fault event evaluator 23 is set up for accessing the fault event time series in the fault database 31, for assessing the individual fault events using a configured assessment model 32, and for displaying results by a statistics display 13.

A fault cause determiner 24 accesses the fault database 31 and a configured fault and recommendation model 33 and displays determined causes of faults and possibly also recommendations for fault elimination in a cause-of-fault display 14.

The offline system part 5 is set up for finding and adapting the best-suited model from a supply of generic models 36 by a model editor 15 and a model searcher 27.

Models 35 configured by a model configurer 25 can be stored locally in the service device 3. They can also be stored externally in a locally distributed form via a suitable interface. By a model generator 26, configured models 35 can be stored. Configured models 35 devised in the offline system part 5 and in offline mode are made available to the online system part 4 as configured assessment model 32 or fault model 33.

The mode of operation of the system is explained below with reference to FIG. 3 in conjunction with the representations in FIGS. 4 to 12.

Figure 3:
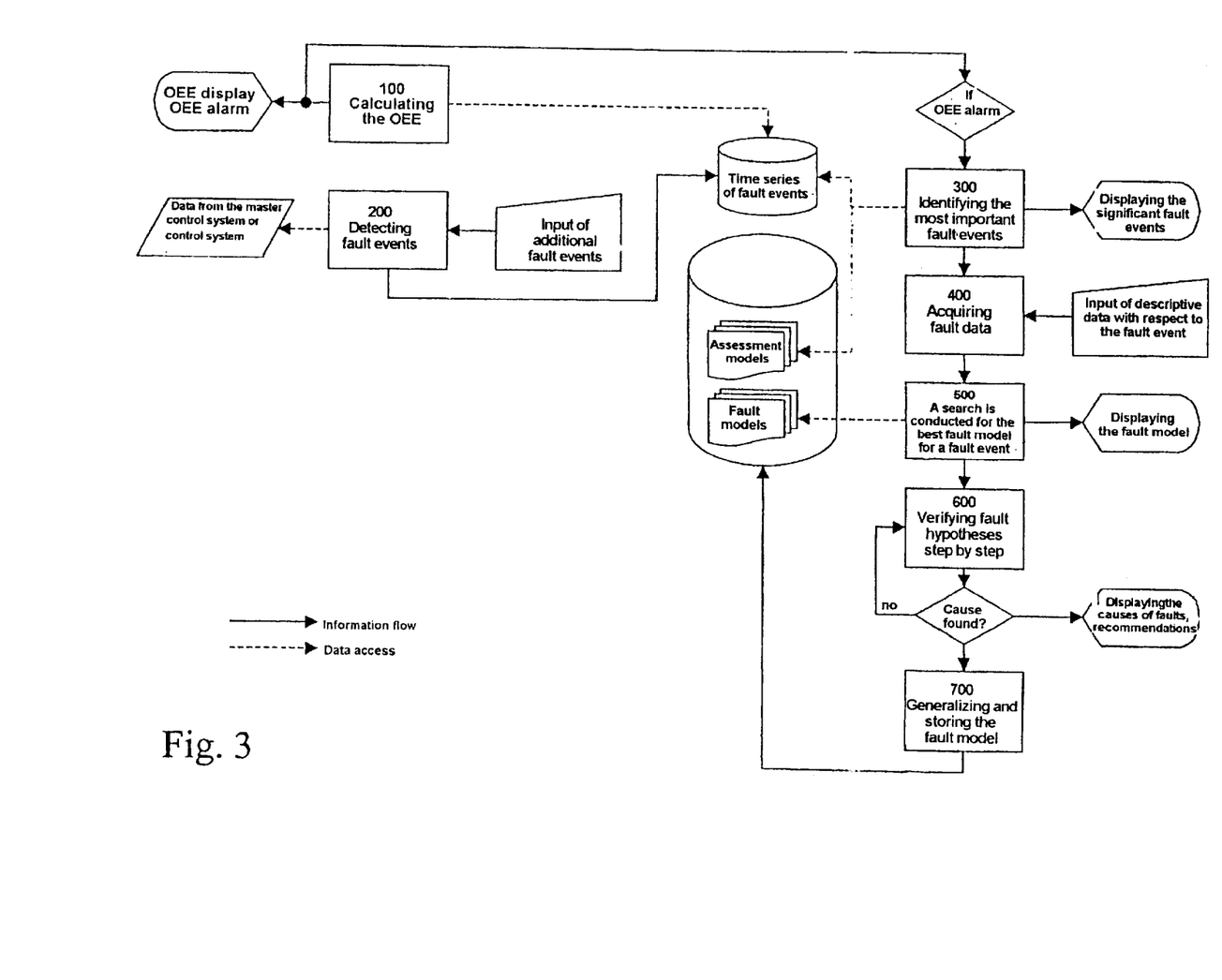
FIG. 3 is a block diagram of the operating mode of the system.

FIG. 3 shows the individual steps of the method for the automated determination of the effectiveness of a production installation, significant fault events and the causes of an effectiveness deviating from a prescribed desired state.

In step 200, data are accessed from the master control system or control system, that is the data server 30 (see. FIG. 2), and a detection of fault events stored in the fault database 31 takes place (see FIG. 2).

Figure 6:
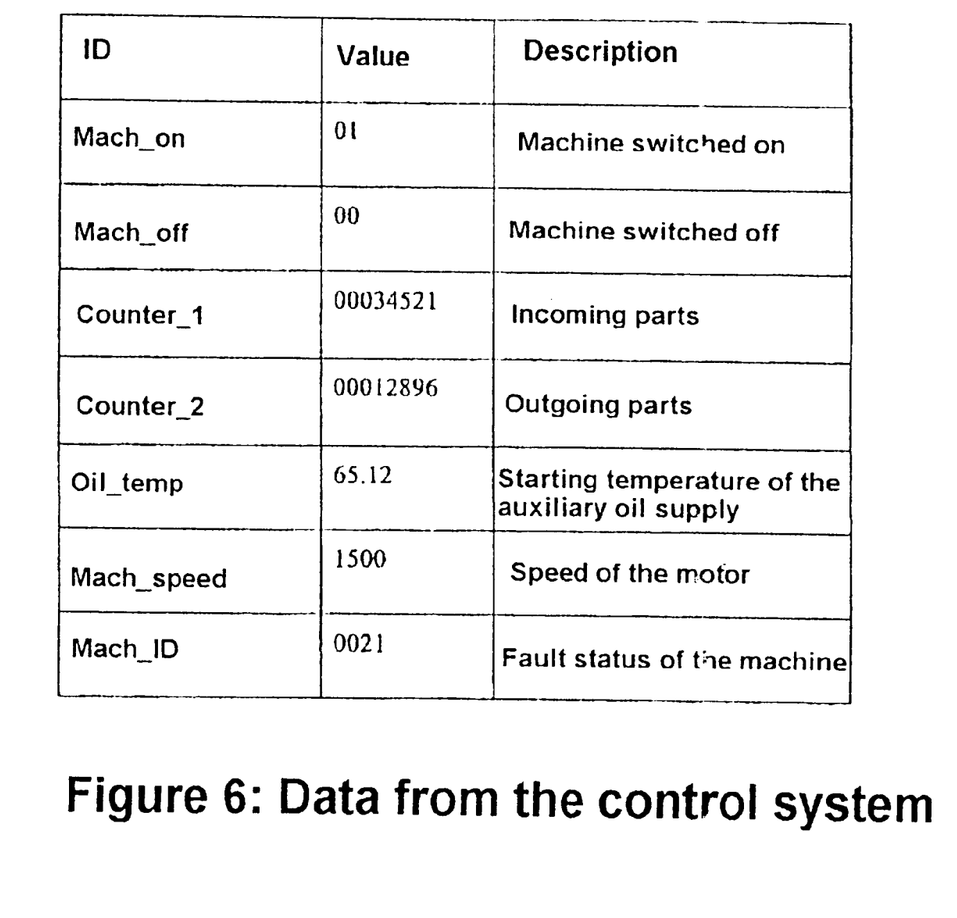
FIG. 6 is a table showing an example of data that can be called up from a control system or master control system.

FIG. 6 shows a typical data record which can be called up. In the simplest case, it contains an identifier (ID) for the signal and its value. Depending on the system, additional information, such as data type, descriptive data and system time, is accessible. For calculating the OEE, often signals concerning the status of the machine, counter readings and motor speeds are inquired. For the documentation of faults, measured values of physical variables and fault-status signals are additionally helpful.

In step 100, a calculation of the OEE number takes place on the basis of the called-up data and fault events, and on the basis of an implemented OEE formula.

Figure 13:
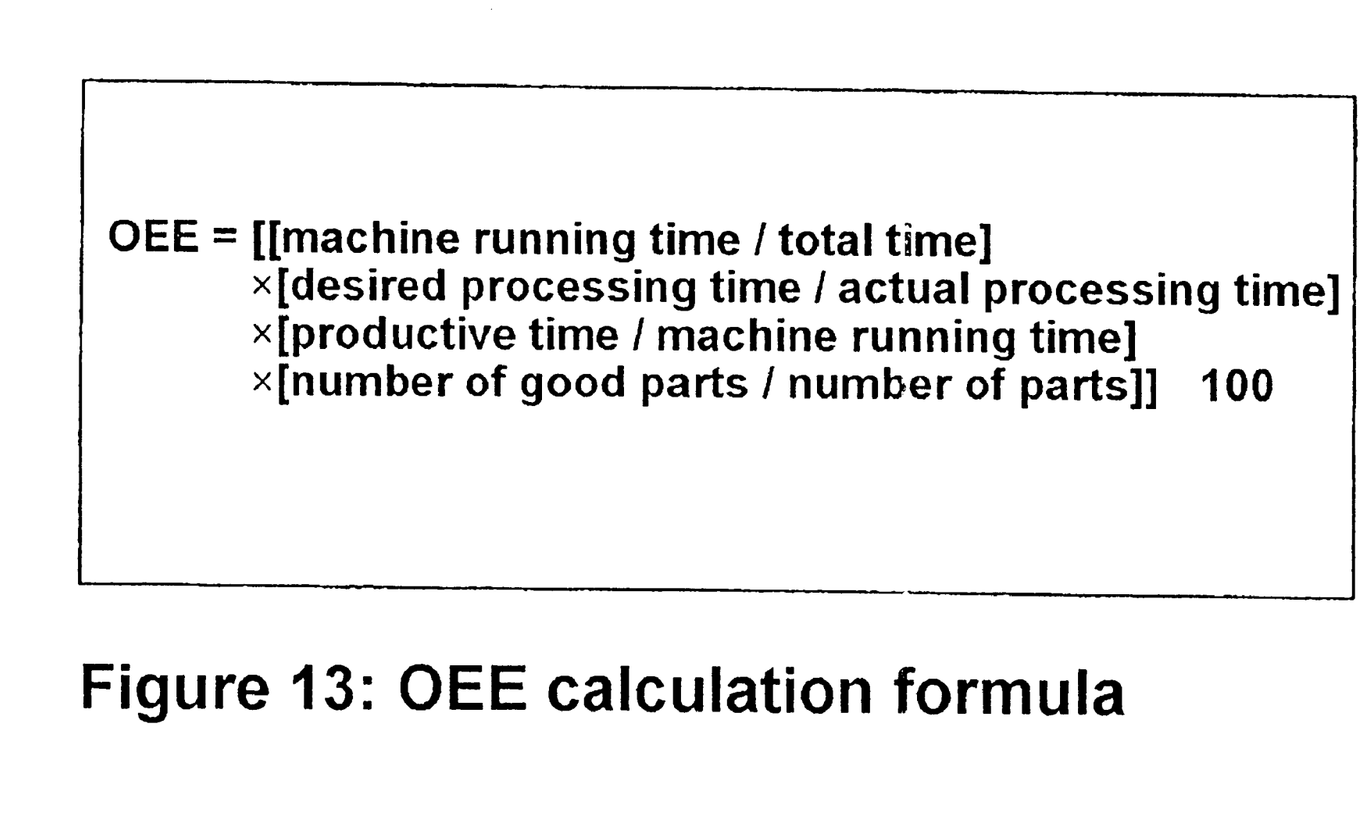
FIG. 13 shows a typical OEE calculation formula.

FIG. 13 shows a typical calculation formula for the OEE. The OEE formula can be configured for a specific installation. In the example, the first line in the formula represents the availability component, the second and third lines represent the performance component and the fourth line represents the quality component of the OEE. The overall OEE is obtained from the product of the individual components. The OEE is typically given in percents.

Figure 4:
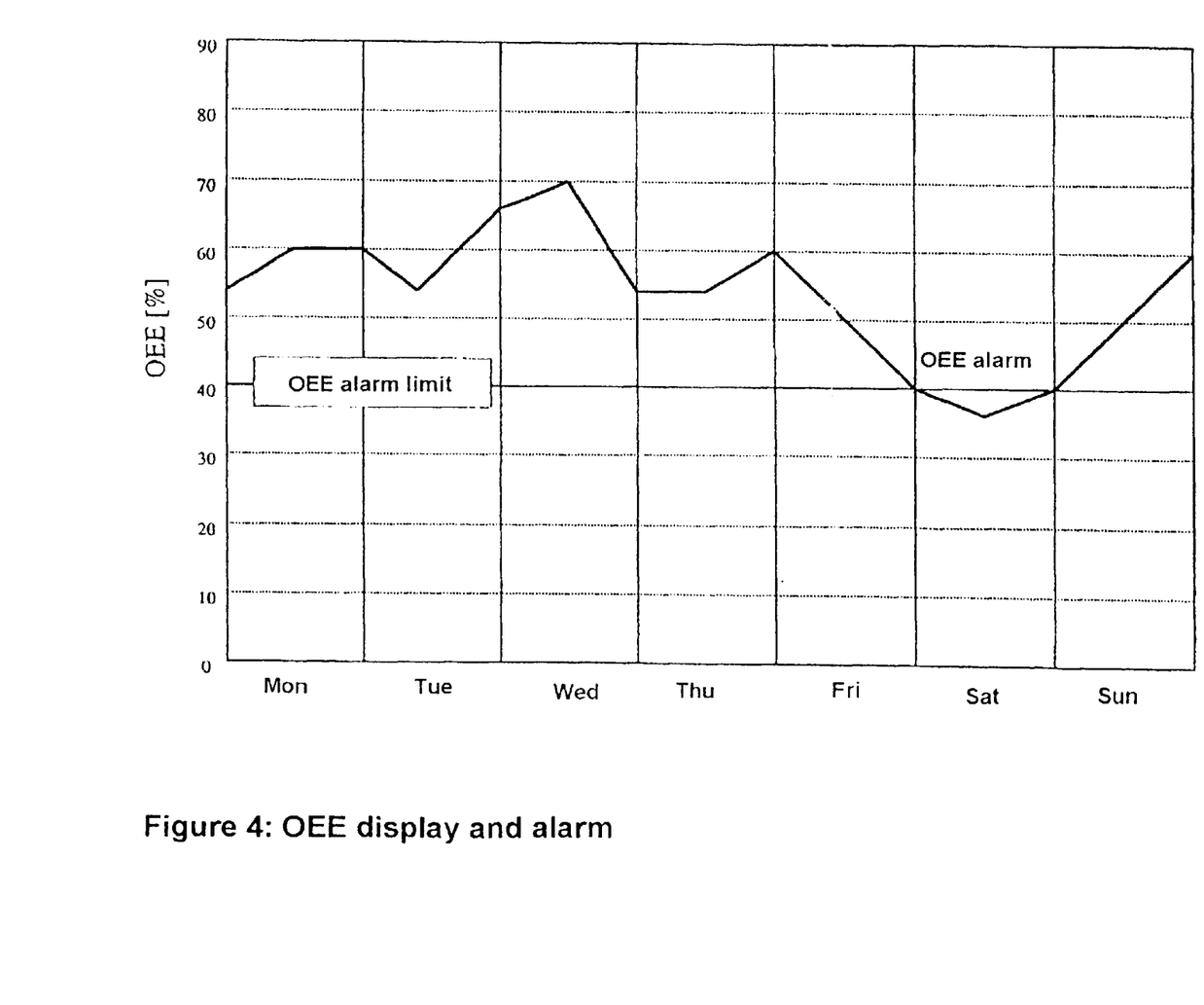
FIG. 4 is a graph showing a typical OEE display, including the forming of an alarm.

The calculation result is displayed on the OEE display 11 (see FIG. 2). FIG. 4 shows an example of an OEE display, the OEE being calculated in percents and displayed as a trend for a week. The forming of an alarm is also represented. The OEE alarm limit is set at 40%. If it drops below the limit value, the OEE trend for example changes color, for the purpose of giving a visual alarm.

Figure 5:
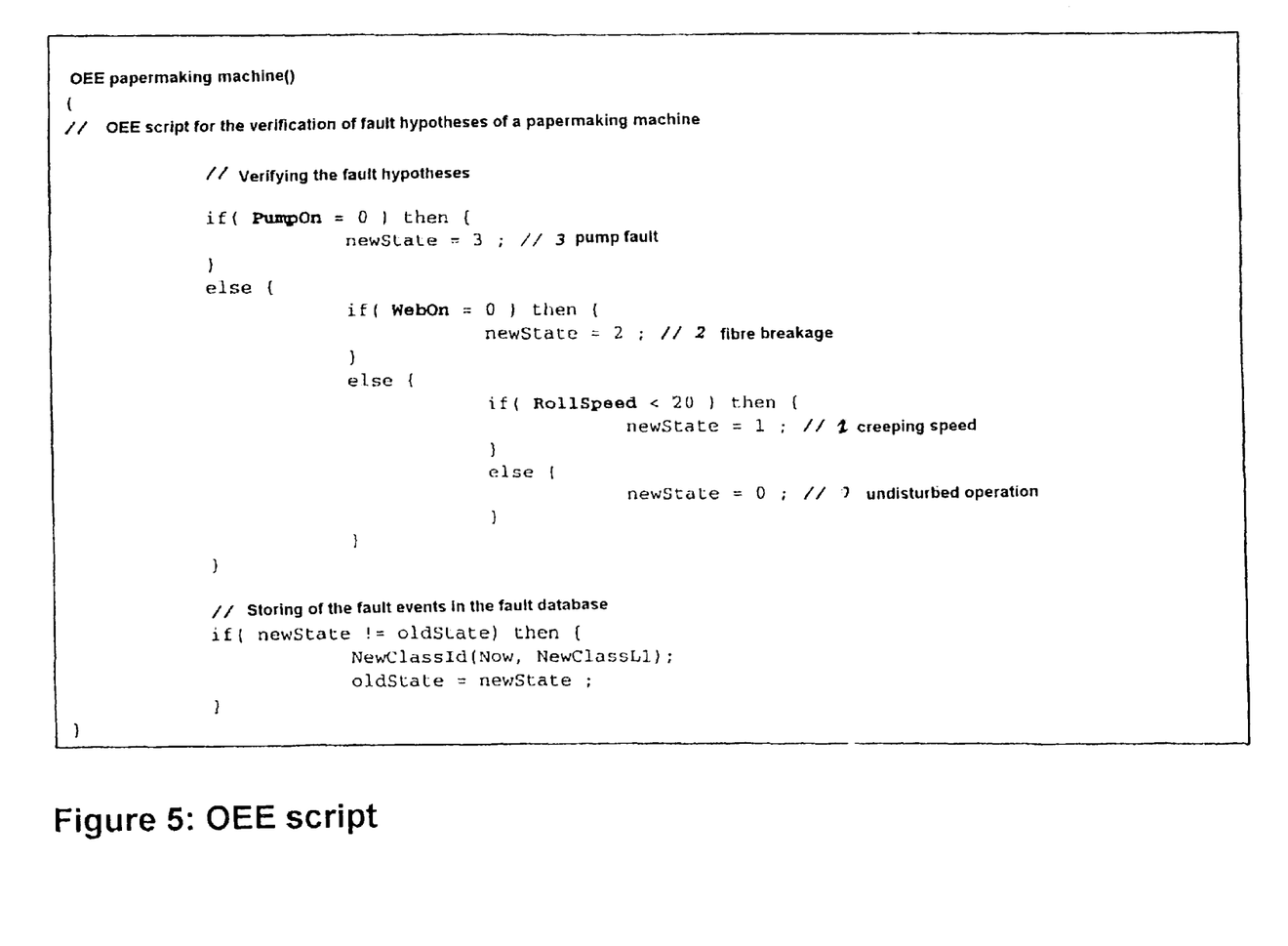
FIG. 5 shows an OEE script for the verification of fault hypotheses.

In step 200, the data from the control system or master control system are searched for fault events in a way corresponding to the criteria in an OEE script. FIG. 5 shows an example of such an OEE script for the verification of fault hypotheses of a papermaking machine. Detected fault events are stored in the fault database 31 (FIG. 2).

Additional fault events, input by a user, can be stored in the fault database 31.

Figure 7:
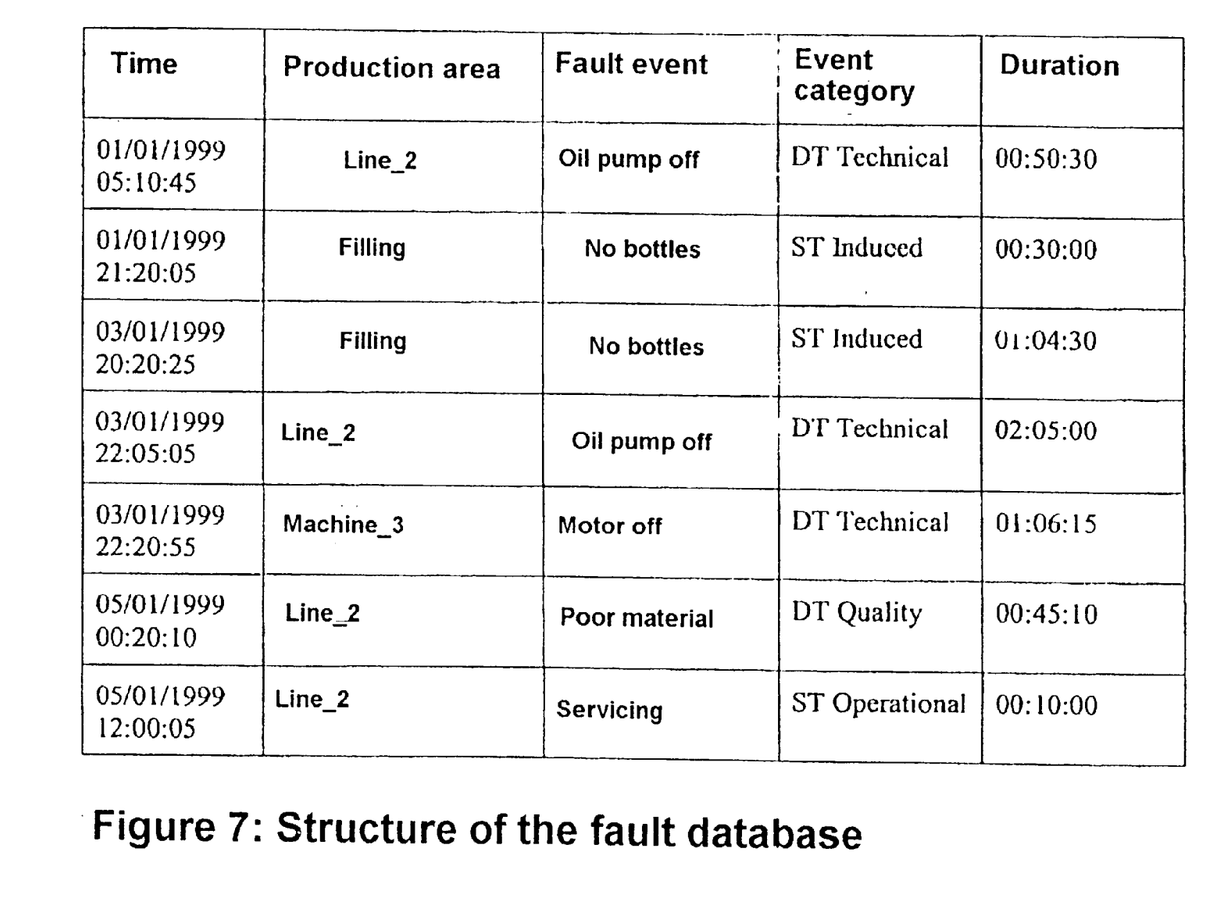
FIG. 7 is a table showing an example of a structure of a fault database.

FIG. 7 shows by way of example information stored in the fault database 31. The data records are stored chronologically as histories. A data record contains a so-called time stamp (date and time of day), the production area in which the fault event occurred, the description of the fault event and the corresponding event category and also the duration of the event.

Figure 8:
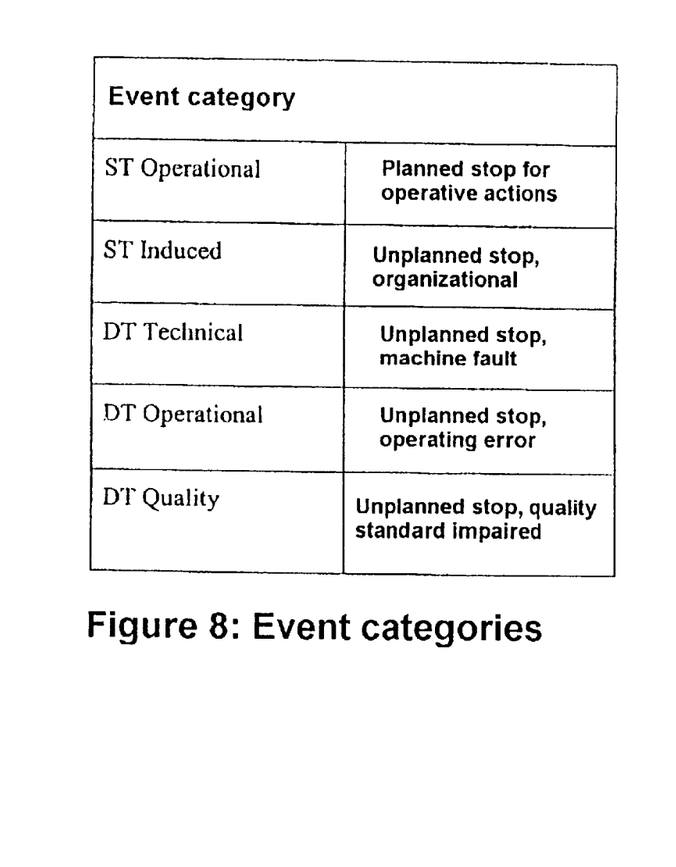
FIG. 8 is a table showing event categories by way of example.

FIG. 8 shows examples of event categories. The ST Operational identifies a planned stop in production for operative actions, such as re-equipping of machines or standard tests.

ST Induced identifies unplanned stops due to external influences (not due to the technical installation), such as insufficient material, insufficient personnel, unplanned meetings.

DT Technical identifies all unplanned stops due to equipment faults or maintenance errors.

DT Operational identifies unplanned stops owing to raw materials and/or auxiliaries of inadequate quality and owing to unplanned tests or dirt, caused by the process or the product.

If an alarm is displayed on the OEE display and an alarm message is triggered, a cause analysis begins with step 300. In this analysis, the significant fault events are identified by accessing the fault database 31 and the configured assessment model 32 (FIG. 2). Fault events lying within a chosen time interval are statistically evaluated with regard to the costs caused, by a Pareto analysis with the assistance of the assessment model 32.

Figure 9:
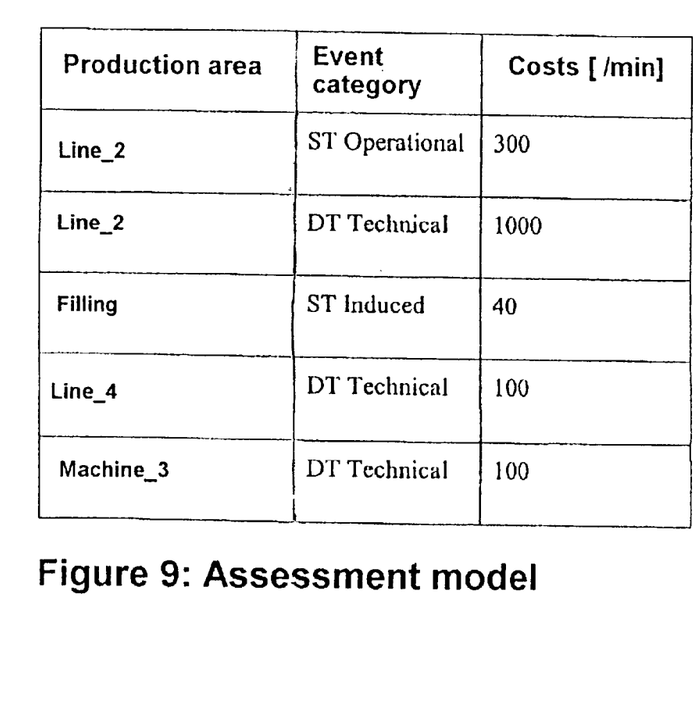
FIG. 9 is a table showing an example of an assessment model.

FIG. 9 shows an example of an assessment model 32. The assessment model indicates which costs per unit of time are caused by the stoppages of certain production areas/machines.

In the assessment model given by way of example, the costs are also determined by the event category.

Figure 10:
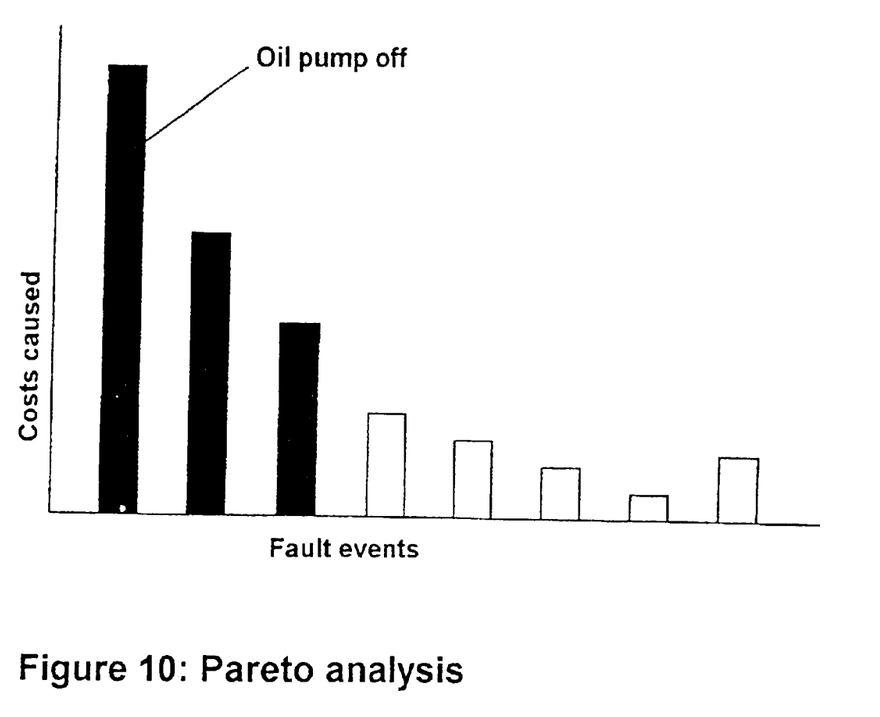
FIG. 10 is a graph showing a result of a Pareto analysis by way of example.

FIG. 10 shows by way of example the result of a conducted Pareto analysis. The Pareto analysis summates the various fault events and carries out an assessment with regard to the costs caused. As a result, the significant fault events are identified. One possible form in which this can be visually presented, is by a bar diagram. In the example, the fault event "oil pump off" causes the highest costs.

For a certain fault event, the cause of which is to be analyzed, the necessary data are acquired in step 400.

In step 500, an error model in the library is accessed by data that describe the fault event. In the online mode, running in an automated manner, the previously configured fault model 33 (FIG. 2) is used. In the offline mode, a search can be conducted for the best-matching fault model and it can be visually presented to the user. The user can then edit the model.

Figure 11:
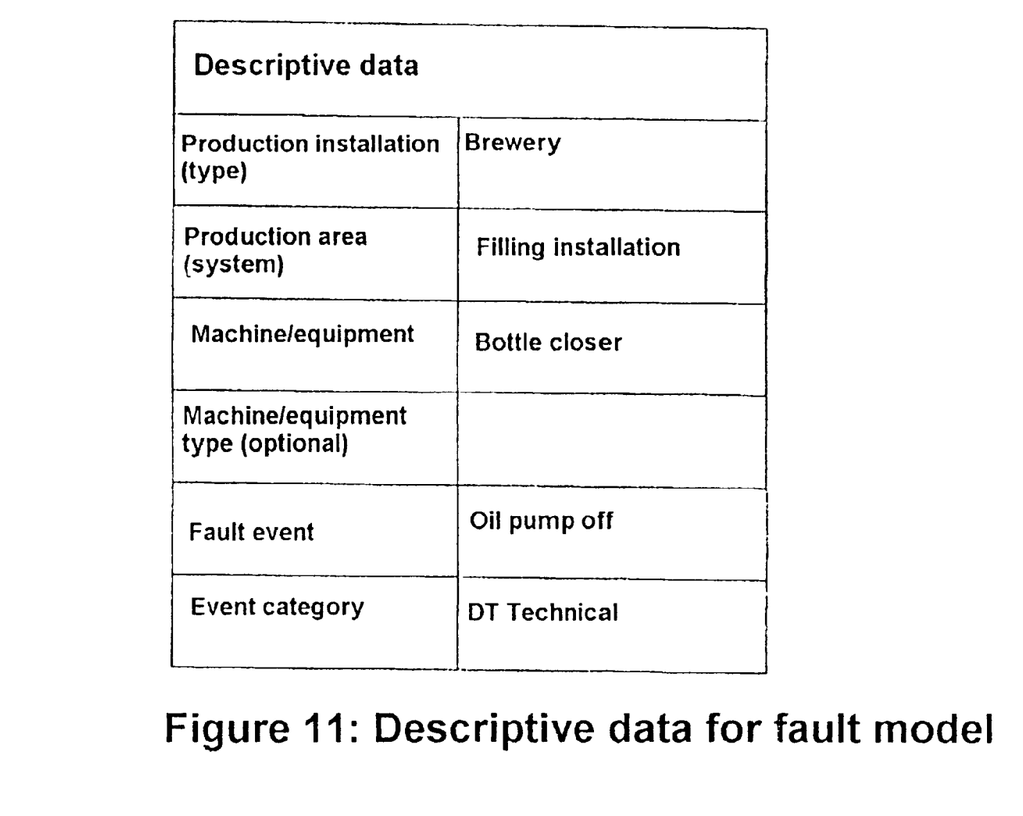
FIG. 11 is a table showing description data for an error model.

FIG. 11 shows by way of example descriptive data for a fault model concerning the fault event "oil pump off". The descriptive data serve the purpose of storing the fault model in a structured form in a library. If the models are needed again, the fault models can be accessed by a search inquiry. Typical description data for a fault model are obtained from the designation of the fault event, its category and the technical environment, such as the type of production installation, production area and, further refined, the machine and equipment and their type classification.

Figure 12:
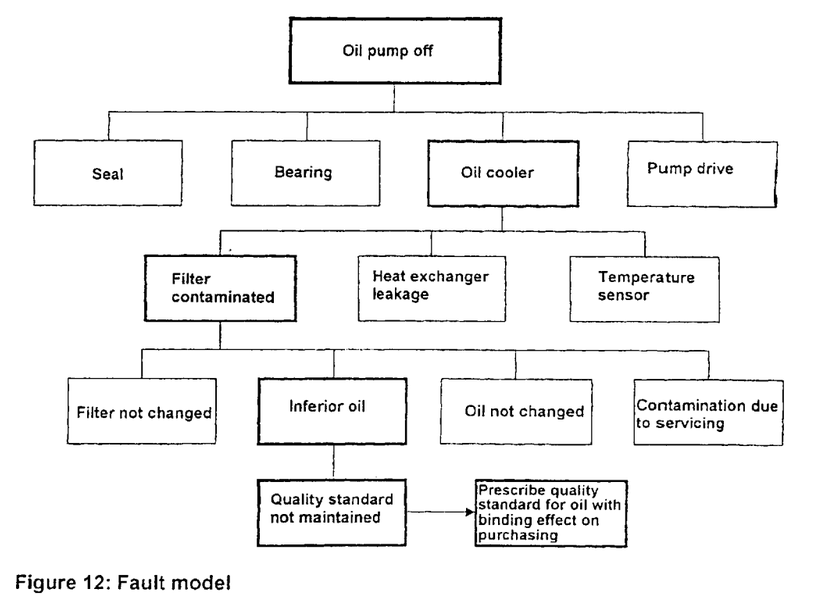
FIG. 12 is a block diagram showing an error model for an "oil pump off" fault event.

FIG. 12 shows a fault model concerning the fault event "oil pump off". The model is based on a logical tree structure. The box on the uppermost level represents the fault event. A number of levels of cause/effect relationships then follow. Causes may be classified as physical, human and organizational. The example shows the path from the fault event to the actual cause: oil pump off, oil cooler, filter contaminated, inferior-quality oil, quality standard not maintained. Moreover, the fault model can cooperate with a recommendation model. In the example, the recommendation of prescribing quality standards with binding effect on purchasing is given for the cause.

In step 600, the fault model is worked from the top down. The fault hypotheses of the various levels are verified on the basis of the descriptive data available. Once the actual cause of the fault has been found, a recommendation for eliminating the cause is output in addition to the description of the cause.

In step 700, the results of the conducted cause analysis are assessed with regard to reusability. The fault model may have causes added to it or taken away from it as a result of these processes. The model is subsequently stored in the library.

We claim:

1. A system for determining an effectiveness of production installations of various types, significant fault events which bring about deviations from a prescribed desired effectiveness, and causes of the significant fault events, the system comprising:

a data acquisition device to be connected to a respective production installation and set up for continuous acquisition and ready-to-call-up storage of data including installation-related data and production-related data; and a service device connected to said data acquisition device, said service device including:
an input device for inputting additional descriptive data including installation-related descriptive data and production-related descriptive data that cannot be called up from said data acquisition device;
a display device for displaying the effectiveness determined, the significant fault events and the causes of the significant fault events;
an online system part connected to and set up for calling up the installation-related data and the production-related data from said data acquisition device, said online system part having a fault event detector detecting the significant fault events on a basis of the data, the additional descriptive data input by said input device, and on an overall equipment effectiveness (OEE) script, and online system part determining the significant fault events by fault event evaluation using a configured assessment model, determining in each case the causes of the significant fault events using a configured fault model, and calculating the effectiveness;
an offline system part connected to said online system part, said offline system part one of containing and has access to a number of models including generic fault models and assessment models, said offline system part set up for searching for the models on a basis of at least one of called-up and input descriptive data, said off line system part configuring the models and storing the models one of locally and in a locally distributed form, said offline system part configured for storing the models in said online system part as one of the configured assessment model and the configured fault model.

2. The system according to claim 1, wherein said respective production installation is selected from the group consisting of a single machine and an installation having a number of machines.

3. The system according to claim 1, wherein said data acquisition device is part of one of a master control system and a programmable controller.

4. The system according to claim 1, wherein said service device is set up for using a web browser to access models which are a stored on a web server and for storing configured models there.

5. The system according to claim 1, wherein said online system part has an OEE calculator set up for calculating the effectiveness by using a stored OEE calculation formula.

6. The system according to claim 1, wherein said fault event detector is set up for detecting the significant fault events by limit value monitoring the OEE script.

7. The system according to claim 1, wherein said online system part is set up for determining the significant fault events using a Pareto analysis and said configured assessment model.

8. The system according to claim 1, wherein said online system part includes a cause determiner set up for determining causes of the significant event faults by using fault event data and one of the configured fault model and an expert system.

9. The system according to claim 1, wherein said service device is set up for at least one of determining recommendations for eliminating the significant faults events, visually presenting the significant fault events and outputting the significant fault events for further transmission.

10. The system according to claim 1, wherein said offline system part has a model searcher and a library storing the generic fault models for finding a best model, the best model being a fault model of which a fault event description is most similar to a respective search inquiry.

11. The system according to claim 1, wherein said offline system part includes a model configurer and a model editor connected to said model configurer for configuring the generic fault models.

12. The system according to claim 10, wherein said offline system part includes a model generalizer for generalizing configured models and for storing the configured models in said library for reuse.

13. The system according to claim 10, wherein said offline system part includes a model editor and with the aid of said model editor a search inquiry can be formulated for said model searcher.

14. A method for automatically determining an effectiveness of a production installation, significant fault events and causes of the effectiveness deviating from a prescribed desired state, which comprises the steps of:
    calling up productivity-relevant historical data acquired and stored by a data acquisition device connected to the production installation using a fault event detector;
    inputting additional data including installation-related data and production-related data;
    carrying out a continuous calculation of the effectiveness using an OEE calculator;
    performing an investigation of the data with regard to fault event patterns using a fault event detector;
    storing detected fault events as time series in a fault database;
    identifying the significant fault events from the detected fault events using a fault event evaluation and a stored configured assessment model;
    determining causes of faults using a cause determiner with respect to a respective significant fault event, taking into account additionally input data containing a description of specific environmental conditions; and
    presenting the causes of faults determined and the effectiveness determined at least one of visually and as a data output.

15. The method according to claim 14, which comprises carrying out the continuous calculation of the effectiveness using the OEE calculator and by accessing the fault events stored in the fault database.

16. The method according to claim 14, which comprises editing additional fault events, which cannot be detected by the fault event detector using a configured OEE calculation script, using a fault event input.

17. The method according to claim 14, which comprises:
    determining significant fault events using a fault event evaluator; and
    presenting visually the significant fault events in a Pareto diagram.

18. The method according to claim 14, which comprises:
    using a model searcher for searching by use of descriptive data stored in a model library for that generic model which best matches a specific fault event and the production installation; and
    feeding the generic model to a model editor and to a model configurer for forming configured models, the configured models are used for an evaluation of fault events and for a cause analysis.

19. The method according to claim 18, wherein for determining the causes of faults by the cause determiner, cause hypotheses of a configured error model which contains cause-effect diagrams extending over a number of model levels are verified by the cause determiner using the descriptive data, the configured error model being worked step by step from one level to the next until an actual cause is found.

20. The method according to claim 14, which comprises using a fault model, which has a recommendation model added to it and with the aid of which recommendations for eliminating faults are determined and output.

21. The method according to claim 18, which comprises:
    generalizing models configured in a course of the method by a model generalizer for later reuse resulting in generalized models; and
    storing the generalized models in a model library, elements of a respective model being one of generalized and removed.

* * * * *